United States Patent Office 3,228,771
Patented Jan. 11, 1966

3,228,771
PROCESSING OF WHEAT AND PRODUCT
PRODUCED THEREFROM
Michael J. Copley, Berkeley, Robert E. Ferrel, Richmond, and James W. Pence, El Cerrito, Calif., assignors to the United States of America as represented by the Secretary of Agriculture
No Drawing. Filed Apr. 2, 1962, Ser. No. 184,606
8 Claims. (Cl. 99—80)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates, in general, to the processing of wheat and has as its primary object the provision of processes for preparing novel wheat products. Further objects and advantages of the invention will be evident from the following description wherein parts and percentages are by weight unless otherwise specified.

It is well known that there exists a large surplus of wheat in the United States whereas there are food shortages in many parts of the world, particularly in India and the Far East. It might be expected that surplus wheat could be exported to relieve these food shortages. A significant obstacle is, however, that people in the area in question are not familiar with wheat, nor its culinary uses. Ordinarily wheat is converted into flour which is then used in the preparation of bread or related bakery products. Although the use of bread as a staple food has an ancient tradition in Europe and countries having a European background, it is little known in the Far East; people in this region, although short on food, are accustomed to a diet of rice and have little interest in bread. As a consequence, a successful program requires conversion of wheat into a product which is adapted for consumption in the form of the grains, as is the case with rice. A particular object of this invention is the provision of processes whereby wheat can be readily converted into products which resemble rice and which have culinary uses similar to those of rice.

It is recognized that there is a wheat product in the form of whole or cracked grains, commonly termed bulgur, which is well known in the Middle Eastern countries. Bulgur is essentially dry, parboiled wheat which has culinary uses similar to those of rice. Traditionally, bulgur is prepared by simmering the whole wheat berry in water until the grains become tender. The cooked grains are then spread in the sun to dry. As a final step, the dry grains may be rubbed by hand to remove the outer layers of bran and the grains may be cracked in crude mills. In more modern practice, the whole wheat berry is soaked in hot water until its moisture content is increased to about 40% and the moistened grain is then cooked with steam under pressure to gelatinize the starch in the grains. The resulting cooked grains are then dried in a current of hot air and pearled to remove the outer bran layers. Often the product is cracked although some consumers prefer it in the whole grain form so that the product is commercially available in both whole grain and cracked grain styles.

Although bulgur is a flavorsome and nutritious food, it is not the complete answer to the problem in question. Several items are to be considered in this regard. A primary point is that since bulgur retains much of the bran of the original wheat berry, it has a drak brown or even red color, depending on the type of wheat from which it was produced. Consumers in the Asiatic countries, having a long tradition of eating white rice, find these dark colors unattractive and thus bulgur does not find acceptance in these areas. Also, bulgur is most commonly sold in cracked grain form (so that its cooking time will not be unduly excessive) and this broken grain appearance clashes with the traditional desire for the whole grain form of a cereal, as is the case with rice. Another item is that bulgur is susceptible to developing rancid odors and tastes, particularly if stored at elevated temperatures such as commonly experienced in Asiatic countries. The instability of bulgur is principally due to the fact that it still retains the germ and the fat therein is unsaturated and prone to develop rancidity. A further point is that bulgur is not in the class of foods which might be termed convenience foods; its preparation for the table requires considerable time and some degree of skill on the part of the cook. The point is that the product must be cooked to such an extent as to tenderize the grains but the cooking period must not be prolonged to such an extent as to produce a sticky product. Usually, the proper cooking of the bulgur requires heating it in water for 20–40 minutes and care is always required to avoid over-cooking, thus to prevent formation of an unpalatable, sticky product. Also, precautions must be taken to prevent the grains from sticking to the hot surface of the cooking vessel and thus developing offensive odor and taste. With regard to the long cooking times required for bulgur, it is to be noted that the countries which have food shortages also are often deficient in fuel supplies so that a product which requires consumption of considerable fuel for its preparation, cannot be considered as a solution to the problem.

By proceeding in accordance with the invention one is enabled to prepare wheat products which obviate the disadvantages enumerated above and which have heretofore hindered the widespread use of wheat in underfed areas of the world. Moreover, although the invention is particularly aimed at the problem of converting wheat into products acceptable in Asiatic or other areas traditionally accustomed to rice as a staple, the invention is not so limited; in its broad aspect, the products described herein are suitable as foods in any area.

The procedures of the invention take a direction which is entirely distinct from those applied in the case of conventional wheat processing (flour production) and from those applied in the production of bulgur. Thus in flour produtcion the wheat berry is crushed or milled in a series of stages, with sieving being applied after each milling stage. In each of these sieving operations the crushed endosperm fragments pass through the sieves whereas bran and germ particles remain on the sieves. The material which passes through the sieves is subjected to further milling, eventually producing the finely-powered endosperm, or flour. The various fractions of bran and germ are also recovered and used in feeds. In bulgur manufacture the entire wheat berry is subjected to steeping, cooking, and drying. Following drying, the grains are subjected to a rubbing or pearling which removes only a portion of the bran, mostly the outer chaffy layers. In contrast to these prior techniques, in applying the process of the invention a primary step involves a de-branning and de-germing of the raw wheat berry without significant breaking of the grains. This primary step is preferably carried out by subjecting the wheat to an operation wherein the grains are rubbed against one another in the presence of a fine abrasive material. A typical apparatus for carrying out this step is a mill of the type in which there is provided a working chamber wherein the grains are rubbed against one another by the action of a rotating impeller. Usually, a piston-like arrangement is provided to force the grains tightly into the working chamber so that the individual grains will rub against one another rather than just being mixed about. Such devices are commonly termed mills although it is to be understood that they are not in the same category as mills of the type which are used in crushing or pulverizing operations.

As noted briefly above, the rubbing action is carried out in the pressure of an abrasive material. Thereby one achieves not only an increase in the rate of bran removal but also one achieves a result—germ removal—which cannot be attained in the absence of the abrasive. Thus, where the grains are subjected to rubbing action without added abrasive, bran removal takes place but very little of the germ is separated. On the other hand, by adding the abrasive an effective removal of both bran and germ is readily accomplished. It is preferred to employ an abrasive in a finely powdered form rather than in coarse or grit form as the fine abrasive permits one to obtain grains which have a more uniform appearance and are relatively free from deep scratches, gouges, or other surface mars. Usually, calcium carbonate is preferred as the abrasive, although other materials such as diatomaceous earth, rice hull ash, bauxite, etc., may be used. Generally, the abrasive is employed in a proportion of about 0.1 to 5%, based on the weight of wheat. A particular advantage in the use of calcium carbonate is that any residue of this compound which remains with the product would be nutritionally advantageous, particularly in areas where the population subsists largely on a cereal diet. In such areas there is generally a calcium deficiency because of the calcium-binding properties of the phytates present in cereal foods and the residual calcium carbonate on the product would tend to counteract this calcium deficiency.

It is also preferred to moisten the wheat prior to subjecting it to the rubbing operation whereby to attain more effective action. Usually, the wheat is moistened with about 1 to 5% of its weight of water just prior to applying the rubbing action. Once the grain has been moistened, it should be subjected to the rubbing action within not more than about 5 to 15 minutes as any extended standing will vitiate the effect of the moistening treatment. Also, a long standing after moistening may tenderize the grains so that the percentage of breakage will be increased.

It is obvious that the conditions applied in the rubbing operation—for example, the time of treatment, the pressure at which the grains are rubbed against one another, the proportion of the abrasive material, etc.—determine the proportion of bran and germ removed from the wheat grains. Usually, the conditions are adjusted so that there occurs at least a partial de-germing and a partial de-branning. By partial de-germing is meant that at least 30% of the germ is removed. By partial de-branning is meant that the total bran, the outer bran coats are removed without removing the innermost bran coat. Thus, the treated grains still retain the innermost bran coat and may in addition retain one or more of the intermediate bran layers. These physical changes can be readily understood by consideration of the structure of the wheat grain. Thus the wheat grain or berry, after threshing to remove the husk, consists of a starchy endosperm to which is attached the germ and a bran envelope surrounding the endosperm and germ. This bran envelope is generally regarded as consisting of six distinct superposed layers or costs. Of particular interest are the innermost, relatively thick layer termed the aleurone and the thin layer above the aleurone termed the seed coat or testa. As noted above, in the general practice of this invention the innermost (aleurone) bran layer is retained. In this connection, it is to be realized that the aleurone layer is relatively thick and its removal would entail a considerable drop in yield of product. Moreover, the aleurone layer does not exert any disadvantageous effect on the product and, in fact, may offer advantages. Of interest in this connection are the facts that the aleurone layer is not deeply pigmented; it contains substantial proportions of vitamins, particularly those of the B group; it is relatively permeable to water (thus products retaining this layer can imbibe water readily when prepared for consumption); it acts to minimize cohesion between individual grains when the products are prepared for the table and to prevent disintegration of grains during cooking. In an especially preferred embodiment of the invention, the conditions of the rubbing treatment are controlled to attain substantial removal of the testa since this bran coat, although it is quite thin, is highly pigmented and is relatively impervious to the penetration of water.

Following the de-branning and de-germing treatment, the wheat grains are subjected to a bleaching treatment to reduce the color displayed by the grains. Usually, after the rubbing treatment the grains have a brown or reddish cast, depending on the type of wheat employed and for consumer acceptance it is preferred to bleach the grains to remove most of this pigmentation. The bleaching may be accomplished in a wide variety of ways using such agents as benzoyl peroxide, hydrogen peroxide, chlorine, chlorine dioxide, sulphur dioxide, or other conventional bleaching agents. These agents may be applied to the dry grain. In the alternative, the grain may be moistened, for example, with 1 to 15% of its weight of water, prior to contact with the bleaching agent or the grain may be treated with an aqueous solution of the bleaching agent. One may employ a single bleaching agent or two or more thereof may be applied in succession. An alternative procedure involves first treating the grain with an oxidizing agent and then subjecting it to contact with a bleaching agent. An example of such procedure involves first treating the grain with aqueous permanganate solution and then with gaseous sulphur dioxide. It is obvious that in any bleaching system which involves moistening, the grain is dried following the bleaching operation so that it will keep properly.

The product of the invention is prepared for the table in the same manner as conventional with rice, that is, cooking in water or steaming until tender.

In a preferred embodiment of the invention, the treated wheat is subjected to a puffing procedure whereby to yield a product which requires a shorter cooking time in preparing it for the table. The puffing step is preferably applied after the grain has been de-branned and de-germed but before it is subjected to bleaching. This sequence of operations has the benefit that any coloration imparted to the grain by the puffing treatment is removed in the subsequent bleaching operation. However, it is within the purview of the invention to apply the puffing step after the bleaching operation. The puffing step is carried out by contacting the wheat with a current of hot air to cause the grains to puff, that is, to increase in size. As a result of this treatment, the product has a volume of about 1.2 to 1.5 times that of the original kernels. Moreover, this expansion does not rupture the kernels nor distort their shape; thus, the expanded kernels have the same shape as the original kernels except that their dimensions are larger, the expansion being caused by the formation of a multitude of small, spheroidal voids uniformly dispersed throughout the interior of the wheat kernels. The wheat material is thus changed from a relatively dense material which resists penetration of water to a porous, crisp product which absorbs water readily. In order to achieve a desirable puffing effect, it is necessary that the grains contain moisture. In general, the moisture content of the grains may range from about 10 to about 35%. The moisture content of the starting material may be adjusted to the desired range by simple methods. For instance, if the material is too moist, it may be subjected to a current of warm air to reduce its moisture content. If, on the other hand, it is too dry, it may be exposed to an atmosphere of moist air until its moisture content is increased to the desired level.

The puffing treatment of the invention is effectuated by contacting the wheat with a current of air having a temperature of about 400 to 650° F., preferably about 500 to 600° F. Because of this high air temperature a rapid heating effect is attained with the result that moisture within the kernels is quickly converted into steam and this formation of steam causes the expansion in volume of the grain. In order to enhance this rapid heating effect, the hot air stream is applied at a high velocity, a preferred range of velocity being 200 to 1,000 ft. per minute. The puffing treatment can be carried out with various types of apparatus. As an example for continuous operation, the grains may be carried on an endless belt of screening past a duct which directs the hot air stream through the bed of material on the belt. Another type of device includes an elongated, vertically-disposed chamber provided with an open upper end and an inlet for hot air at the bottom end. A screen is provided near the bottom of the inlet pipe to prevent the wheat from entering the inlet pipe if the air pressure should drop. In using such apparatus, the starting material is placed on the screen and the hot air is introduced into the chamber at such a velocity that the wheat kernels tumble about in the chamber. Regardless of the type of apparatus used, the exposure of the wheat kernels to the current of hot air is continued for a time long enough for the kernels to reach the desired volume increase. This point can be readily ascertained in practice by removing samples as the process continues and determining their bulk density or specific volume. Although a drying effect is attained with the puffing treatment of the invention, the conditions of puffing are not comparable to those used in drying wheat products. Thus in conventional drying treatments, relatively low temperatures on the order of 150° F. are used with the result that moisture is eliminated slowly and the grains do not puff. On the other hand, in the process of the invention, the high air temperature enhanced by the high air velocity cause such rapid evaporation within the grains that the steam is formed at a faster rate than diffusion to the outer surface can occur, with the result that the grains are puffed.

The invention is further demonstrated by the following illustrative examples:

*Example 1*

An 800-gram lot of wheat was sprayed with 1% of its weight of water, mixed with 1% of its weight of powdered calcium carbonate, and placed in a McGill #3 rice mill. The mill was operated 30 seconds with a 12-pound weight compressing the wheat grains, then for 30 seconds with no weight. The treated grain was separated from bran, germ, and broken grain particles, and re-treated in the same manner. Yield of de-branned and de-germed whole grain was 645 grams (80%). Weight of broken grains was 38 grams, weight of separated bran and germ was 117 grams.

Analysis of the original wheat and the product gave the following results:

|  | Fat, percent | Crude fiber, percent | Ash, percent |
| --- | --- | --- | --- |
| Original wheat | 1.53 | 1.50 | 1.53 |
| Treated wheat | 1.15 | 0.96 | 1.24 |

From the drop in fat content it was calculated that the treatment resulted in removal of approximately 35% of the germ.

*Example 2*

To a 226-gram sample of de-branned and de-germed wheat prepared as in Example 1 was added 22.5 ml. of water and the mixture stirred until all the water was absorbed on the grains. The moistened wheat was then placed in a vessel and 400 ml. of sulphur dioxide (measured at room temperature and atmospheric pressure) was introduced and the vessel slowly rotated for 30 minutes to stir the wheat while in contact with the sulphur dioxide. The treated wheat was then removed from the vessel and dried in a current of air at about 100–150° F. It was observed that the wheat grains which were originally of a reddish brown color were now yellowish cream.

*Example 3*

A 250-gram sample of de-branned and de-germed wheat prepared as in Example 1 was mixed with 250 ml. of 0.2% solution of potassium permanganate acidified to a pH of 2 with sulphuric acid. The wheat was held in the permanganate solution for 5 minutes at room temperature, then removed, drained, and rinsed thoroughly with water. The moist wheat was then placed in a vessel and 400 ml. of sulphur dioxide (measured at room temperature and atmospheric pressure) was introduced and the vessel slowly rotated for 30 minutes to stir the wheat while in contact with the sulphur dioxide. The treated wheat was then removed from the vessel and dried in a current of air at about 100–150° F. It was observed that the grains had a cream color whereas prior to the permanganate and $SO_2$ treatment they had a reddish brown color.

In an alternative procedure the wheat, following the treatment with the permanganate solution, was surface dried by contact with a stream of warm air. This reduced clumping when the wheat was exposed to sulphur dioxide and gave a better bleaching effect.

*Example 4*

A lot of raw wheat was subjected to the treatment described herein to de-bran, de-germ and bleach the wheat. This product was then puffed or expanded, applying different conditions to three samples of the wheat. In each case the wheat was placed on a screen at a loading of about one pound per sq. ft. and a current of hot air was forced at a velocity of about 700 ft. per minute upwardly through the bed of wheat kernels for a predetermined period of time. The conditions used in the runs are tabulated below:

| Run | Original moisture content of wheat, percent | Temperature of hot air stream, ° F. | Time of contact with hot air stream, sec. |
| --- | --- | --- | --- |
| 1 | 13 | 480 | 30 |
| 2 | 21 | 480 | 30 |
| 3 | 37 | 570 | 30 |

It was noted in all the runs that the kernels expanded to a volume of about 1.2 to 1.5 times that of the original kernels. The puffed products could be cooked in 10–20 minutes, that is, less than half the time (45–60 min.) required for the wheat before puffing.

*Example 5*

(A) A sample of de-branned and de-germed wheat prepared as described in Example 1 was placed on a screen and a current of air at 410° F. was forced upwardly through the grain at a velocity of about 528 ft. per second. Contact of the grain with the hot air stream was continued for 70 seconds. It was observed that the grains expanded so that their volume was about 1.2 to 1.5 times that of the original grains.

(B) An aqueous solution containing 10% $H_2O_2$ was prepared and heated to 70° C. Two parts of this solution was added to one part of the expanded grain prepared as described above. The grain was held in contact with the hydrogen peroxide solution for 3 minutes while maintaining the temperature at 70° C. The grain was then removed from the solution, rinsed thoroughly with water and dried by exposing it to a current of warm (150° F.) air. It was observed that the product had a cream color and the texture of the grains was crisp and porous.

Having thus described the invention, what is claimed is:

1. A method for preparing a food product from wheat which comprises subjecting raw whole wheat grain to rubbing action against one another in the presence of a finely-divided abrasive whereby to achieve a de-branning of the grains with concomitant de-germing, puffing the treated wheat grains by subjecting them to contact with hot air at a temperature of about 400 to 650° F., and then bleaching the puffed grains.

2. A method for preparing a food product from wheat which comprises subjecting raw whole wheat grains to rubbing action against one another in the presence of a finely-divided abrasive whereby to achieve a de-branning of the grains with concomitant de-germing, adjusting the moisture content of the grains to about 10 to 35%, exposing the treated grains at a moisture content of about 10 to 35% to a current of hot air at about 400 to 650° F. to cause a puffing of the grains, and then bleaching the puffed grains.

3. A food product comprising raw wheat in the form of unbroken grains with at least the outermost bran layer removed but retaining the innermost bran layer and with at least 30% of the germ removed, the grains being in an expanded porous state having a volume of about 1.2 to 1.5 times that of the original grains and retaining the shape of the original grains.

4. A food product comprising raw wheat in the form of unbroken grains with at least the outermost bran layer removed but retaining the innermost bran layer and with at least 30% of the germ removed, the residual bran layer having been bleached, the grains being in an expanded porous state having a volume of about 1.2 to 1.5 time that of the original grains and retaining the shape of the original grains.

5. A method for preparing a food product from wheat which comprises subjecting raw, whole wheat grains to rubbing action against one another in the presence of a finely-divided abrasive, the rubbing action being continued long enough to attain removal of at least 30% of the germ and removal of bran layers, including those having a highly-pigmented and water-impervious nature, but not to the point of removing the vitamin-rich, lightly-pigmented bran layers, adjusting the moisture content of the grains to about 10 to 35%, exposing the treated grains at a moisture content of about 10 to 35% to a current of hot air at about 400 to 650° F. to cause an expansion of the grains without rupture and without distortion to produce porous grains having a volume of about 1.2 to 1.5 times that of the original grains, and then bleaching the expanded porous grains.

6. A method for preparing a food product from wheat which comprises mixing raw whole wheat grains with an abrasive in finely powdered form, forcibly rubbing said grains against one another in the presence of said finely powdered abrasive, continuing said forcible rubbing action long enough to attain removal of at least 30% of the germ and removal of bran layers, including those having a highly-pigmented and water-impervious nature, but not to the point of removing the vitamin-rich, lightly-pigmented layers, the finely-powdered state of the abrasive ensuring formation of a product of uniform appearance, essentially free from deep scratches, gouges, and other surface mars.

7. A method for preparing a food product from wheat which comprises mixing raw whole wheat grains with an abrasive in finely powdered form, forcibly rubbing said grains against one another in the presence of said finely powdered abrasive, continuing said forcible rubbing action long enough to attain removal of at least 30% of the germ and removal of bran layers, including those having a highly-pigmented and water-impervious nature, but not to the point of removing the vitamin-rich, lightly-pigmented layers, the finely-powdered state of the abrasive ensuring formation of a product of uniform appearance, essentially free from deep scratches, gouges, and other surface mars, and bleaching the resulting product.

8. The method of claim 7 wherein the abrasive is calcium carbonate.

References Cited by the Examiner

UNITED STATES PATENTS

| | | | |
|---|---|---|---|
| 340,155 | 4/1886 | Reist | 146—221.6 |
| 576,860 | 2/1897 | Lanaux | 99—230 |
| 842,116 | 1/1907 | Reid | 99—80 |
| 1,042,929 | 10/1912 | Lanaux | 146—252 |
| 2,131,450 | 9/1938 | McKay | 99—81 |
| 2,289,529 | 7/1942 | Thompson | 99—81 |
| 2,505,325 | 4/1950 | Hubbard | 99—81 |
| 2,622,985 | 12/1952 | Haughey et al. | 99—81 |
| 2,929,725 | 3/1960 | Copley et al. | 99—80 X |

FOREIGN PATENTS

| | | |
|---|---|---|
| 118,650 | 6/1944 | Australia. |
| 489,737 | 1/1953 | Canada. |

A. LOUIS MONACELL, *Primary Examiner.*

ABRAHAM H. WINKELSTEIN, RAYMOND N. JONES, *Examiners.*